United States Patent
Galli et al.

[11] 3,839,313
[45] Oct. 1, 1974

[54] CATALYSTS FOR THE POLYMERIZATION OF OLEFINS

[75] Inventors: Paolo Galli; Giovanni DiDrusco; Ermanno Susa, all of Ferrara, Italy

[73] Assignee: Montecatini Edison S.p.A., Milan, Italy

[22] Filed: Jan. 10, 1972

[21] Appl. No.: 216,746

Related U.S. Application Data
[63] Continuation of Ser. No. 864,879, Oct. 8, 1969, abandoned.

[30] Foreign Application Priority Data
Oct. 9, 1968  Italy.................................. 22249/68

[52] U.S. Cl.. 260/94.9 DA, 252/429 C, 260/85.3 R, 260/88.2 R, 260/94.9 E
[51] Int. Cl............................. C08f 3/06, C08f 1/42
[58] Field of Search....... 252/429 C; 260/85.3, 88.2, 260/94.9, 9 DA

[56] References Cited
UNITED STATES PATENTS

| | | | |
|---|---|---|---|
| 3,166,542 | 1/1965 | Orzechowski et al....... | 260/94.9 DA |
| 3,324,095 | 6/1967 | Carrick et al.............. | 260/94.9 DA |

FOREIGN PATENTS OR APPLICATIONS

| | | | |
|---|---|---|---|
| 6,714,024 | 4/1968 | Netherlands................ | 260/94.9 DA |

OTHER PUBLICATIONS
Anderson et al., Trans. Faraday Soc., 61, pp. 2754–2762, (1965).

*Primary Examiner*—Joseph L. Schofer
*Assistant Examiner*—A. Holler

[57] ABSTRACT

There are disclosed new catalysts for the polymerization of olefins and which comprise the products of reaction between organometallic compounds or hydrides of metals of Groups I, II or III of the Mendelyeev Periodic Table and the product obtained by reacting a liquid halogenated compound of titanium or vanadium with a solid carrier containing chemically uncombined water and having the formula

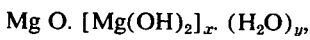
Mg O. [Mg(OH)$_2$]$_x$. (H$_2$O)$_y$, wherein x is a number greater than O and may be 100 or higher; y is a number between 0 and 1; [Mg(OH)$_2$]$_x$ expresses the number of hydroxyls present in the carrier, however combined; and (H$_2$O)$_y$ represents the number of chemically uncombined molecules of water present in the carrier. The catalysts are very active and use thereof in the polymerization of olefins results in high yields of polymers having a low content of foreign substances.

13 Claims, No Drawings

CATALYSTS FOR THE POLYMERIZATION OF OLEFINS

This application is a continuation of application Ser. No. 864,879, filed Oct. 8, 1969, now abandoned.

THE PRIOR ART

Various types of catalysts have been disclosed for use in the polymerization and copolymerization of ethylene. One of the best known of such catalysts is obtained by mixing a compound of a transition metal with an organometallic compound of a metal belonging to Groups I to III, inclusive, of the Mendelyeev Periodic Table.

It has been disclosed that the activity of the catalysts prepared from the transition metal compounds and organometallic compounds of the Groups I to III metals is increased considerably if, instead of using the transition metal compound per se as one catalyst-forming component, there is used the reaction product of the transition metal compound with a solid inorganic carrier containing hydroxyl groups.

In particular, it appears from the Dutch Patent Application No. 6,714,024, that catalysts of increased activity are known which are formed by the reaction product of an organometallic compound of a Group I to III metal with the product obtained by reacting a liquid, halogenated compound of a transition metal with a solid, anhydrous carrier consisting of magnesium oxide containing relatively few hydroxyl groups.

According to said Dutch application, use of the carrier in the anhydrous state is an indispensable, critical requirement for obtaining the catalysts having increased activity.

It was found, further, that catalysts having interesting characteristics can also be obtained by using magnesium hydroxide or products based thereon as the carrier. In that case, also, use of the carrier in the completely anhydrous state was considered to be indispensable and critical to effective use of the carrier.

However, it was further remarked that while use of anhydrous magnesium oxide and/or magnesium hydroxide as carrier resulted in catalysts having an activity such that the need to purify the polymer obtained from the catalytic residues could be avoided, such use is not free from considerable drawbacks and disadvantages.

For instance, when the carrier consists of anhydrous magnesium oxide, the reaction thereof with the halogenated transition metal compound is generally accompanied by a considerable conversion of the latter to by-products which are inactive or only poorly active in the polymerization of the olefins, and which by-products are difficult to remove from the carrier. Such by-products considerably lower the polymer yield in terms of the weight of polymer produced per unit weight of the transition metal present in the catalyst. In order to attain high polymer yields, it is necessary to increase the amount of the supported catalyst-forming component, and thus to increase the amount of carrier used, which in turn increases the quantity of foreign material in the polymer and adversely affects the properties of the polymer.

One of the most serious drawbacks to the use of anhydrous magnesium hydroxide as carrier is the poor reactivity thereof to the halogenated transition metal compound. This also has the result of requiring an undesirable increase in the quantity of carrier used.

THE PRESENT INVENTION

The primary object of this invention is to provide improved, highly active catalysts for the polymerization of olefins prepared from the reaction product of a liquid, halogenated transition metal compound and a carrier, as one catalyst-forming component, but which do not have the drawbacks and disadvantages of the prior art catalysts.

This and other objects are achieved by the present invention in accordance with which it is found that polymerization catalysts having valuable properties and, in certain respects, superior to those obtained using anhydrous magnesium oxides and/or magnesium hydroxides as carriers, can be prepared from carriers containing chemically uncombined water and corresponding to the formula $$MgO \cdot [Mg(OH)_2]_x \cdot (H_2O)_y,$$

in which x is a number greater than 0, and may be as high as 100 or higher;

y is a number greater than 0 and comprised between 0 and 1;

$[Mg(OH)_2]_x$ expresses the number of hydroxyl groups contained in the carrier, and however combined; and $(H_2O)_y$ represents the number of molecules of uncombined water present in the carrier.

The presence of chemically uncombined water in the carriers used in accordance with this invention has been proved by study of the adsorption isotherms of the $MgO - H_2O$ system at various temperatures, and by examination of the x-ray spectra of the carriers. By X-ray examination it was ascertained, also, that the chemically uncombined water present in the starting carrier had not been converted into hydroxide in the product after the reaction of the carrier with the halogenated transition metal compound.

It was altogether unforseeable and unexpected that highly active polymerization catalysts could be obtained from carriers containing chemically uncombined water since, according to prior art teachings, the complete absence of chemically uncombined water from the carrier was considered to be critical.

Carriers which are suitable for the preparation of the present highly active catalysts having valuable properties are those in which, in the formula set forth hereinabove, x is less than 2 and preferably less than 0.5, and y is less than 0.6.

As indicated, the catalysts of this invention are formed by mixing a. the product obtained by reacting a liquid halogenated compound of titanium or vanadium with a carrier of the composition:

$$MgO \cdot [Mg(OH)_2]_x \cdot (H_2O)_y$$

wherein x, y, $[Mg(OH)_2]_x$ and $(H_2O)_y$ have the significance stated above; with b. a hydride or organometallic compound of a metal belonging to Groups I to III inclusive of the Mendelyeev Periodic Table.

The carriers can be prepared according to known methods, by hydration of magnesium oxide and/or magnesium hydroxide, or of products of the partial calcination of magnesium hydroxide.

For instance, the carrier can be prepared by leaving magnesium oxide immersed in water for a given period of time, for example for 1 to 2 hours when the suspension is heated to temperatures comprised between 50°C and 100°C, filtering the suspension, and finally drying the solid at a temperature below 100°C and under moderate vacuum. Preferably, during the hydration, the temperature is maintained below 60°C.

We found that the maximum quantity of water which the magnesium oxide can be made to absorb corresponds substantially to the quantity of water stoichiometrically required for converting the oxide to hydroxide. This finding is in agreement with what was knwon previously, see, for instance, the paper by R. I. Razouk and R. Sh. Mikhail, Jr. Phys. Chem., 59, pp. 636 – 640; 1955.

Furthermore, it has been observed that the maximum amount of water retained by the oxide depends very much on the thermal history of the oxide. In the case of oxides obtained by calcination of magnesium hydroxide at temperatures below 600°–800°C, the maximum quantity of water retained corresponds substantially to the quantity stoichiometrically required for conversion of the oxide to hydroxide.

On the other hand, oxides obtained by decomposition of magnesium carbonate, or by calcination of the hydroxide at temperatures above 800° – 1,000°C, fix maximum quantities of water that are less than the stoichiometric. For magnesium hydroxide, the maximum quantity of water fixed is relatively low, and always less than the stoichiometric.

If it is desired to hydrate the magnesium oxide only partially, it is sufficient to expose the oxide to a current or flow of air or inert gases saturated with water vapor for a time sufficient to insure absorption of the desired quantity of water. This hydration treatment is conveniently conducted in a fluid bed.

As indicated previously, any type of oxide may be used to prepare the hydrated carriers used in the practice of this invention. Preferred oxides are those obtained by calcination of magnesium hydroxide at a temperature comprised between 500°C and 600°C, having a specific surface comprised between 10 and 100 m$^2$/g, a mean granulometric size of from 10 to 30 microns, and a content of hydroxyl groups below about 0.2 groups per mole of oxide.

However, it has been found (and this constitutes another aspect of the invention) that it is possible to obtain carriers useful for preparing very active catalysts having characteristics comparable to those of good quality oxide carriers, even when the starting magnesium oxides have very high specific surface, i.e., generally higher than 100 m$^2$/g, and which due to their excessive reactivity are not useful as such in the preparation of the catalyst because they react in an uncontrollable way with the halogenated transition metal compound, with the formation of an excessive amount of undesirable by-products.

Moreover, we also obtain catalysts having good activity by starting with magnesium oxides of relatively low specific surface, generally less than 10 m$^2$/g, which as such are not suitable for the preparation of very active polymerization catalysts.

In addition, in preparing the carrier, we can use magnesium hydroxide or products of the partial calcination of the hydroxide containing more than 0.2 hydroxyl groups per mole of oxide. Also in the case of magnesium hydroxide, hydration according to this invention yields a carrier useful in the preparation of active catalysts, even starting with hydroxides which, as such, would yield catalysts of low activity.

Preferably, reaction between the hydrated carrier and halogenated titanium or vanadium compound is conducted by reacting the oxide in suspension in an excess of the transition metal compound.

It is also possible to use the titanium or vanadium compound in solution in an inert diluent. However, the results obtained, especially the yield in polymer per gram of titanium or vanadium, is less satisfactory than when the reaction is carried out in the absence of solvents.

The reaction can be conducted at temperatures comprised between 0°C and 300°C, preferably between 100°C and 250°C. After the reaction, the transition metal compound remains chemically fixed on the carrier and cannot be removed by washing with solvents.

Non-limiting examples of liquid halogenated titanium and vanadium compounds which are useful in preparing the present catalysts are the halides, oxyhalides, and halo-alcoholates, including titanium tetrachloride, vanadium tetrachloride, vanadium oxytrichloride, titanium trichloracetylacetonate, titanium trichloromonobutylate, etc.

Organometallic compounds and hydrides of Groups I to III metals which are suitable for use in preparing the catalysts include:
dimethyl aluminum, diethyl aluminum chloride, tri-isobutyl aluminum, di-isobutyl aluminum chloride, di-ethyl aluminum hydride, di-isobutyl aluminum hydride, diethyl aluminum bromide, lithium aluminum tetrabutyl, lithium isobutyl, diethyl magnesium, and ethyl aluminum sesquichloride.

The molar ratio between (1) the organometallic compound or hydride and (2) the halogenated titanium or vanadium compound is not critical. When the catalysts are to be used in the polymerization or copolymerization of ethylene the ratio of (1) to (2) is preferably comprised between 50 and 1,000.

The polymerization of ethylene, or of mixtures of ethylene with other alpha-olefins and/or diolefins, can be carried out in liquid phase, in the presence or absence of an inert solvent, or in gaseous phase, at temperatures comprised between −80°C and +200°C, and preferably between 50°C and 100°C, at atmospheric pressure or at higher pressure.

The molecular weight of the polymer may be regulated according to known methods, for instance by carrying out the polymerization in the presence of halides, alkyl halides, and organometallic compounds of zinc or cadmium, or of hydrogen.

As is known, the activity of conventional catalysts prepared from transition metal compounds and organometallic compounds of metals of Groups I to III is sensibly lowered by the presence of hydrogen or other chain transfer agents used for regulating the molecular weight.

Surprisingly, using the catalysts of this invention, it is possible to obtain polymers having a low, and even a very low, molecular weight without sensibly lowering the activity of the catalyst.

In practice, it is possible to regulate the molecular weight of polyethylene obtained with the aid of the present catalyst within a useful range corresponding to an intrinsic viscosity of from 1.5 to 3.0 dl/g as determined in tetralin at 135°C, without lowering the polymer yield per gram of catalyst to values at which it becomes necessary, at the end of the polymerization, to carry out a purification of the polymer from the catalytic residues. The polyethylene thus obtained is substantially linear, highly crystalline, and has a density equal to or greater than 0.96g/cc. It is more easily processed, particularly by injection molding, than polyethylene obtained with the normal catalysts prepared from transition metal compounds and organometallic compounds of the Groups I to III metals.

The ash content of the polymer not treated for removal of catalytic residues is in general less than 100 parts per million. The Cl content is less than about 30 parts per million.

The hydrated carriers of the invention, in addition to resulting, unforseeably, in catalysts having characteristics comparable to those typical for catalysts prepared starting with carriers formed of anhydrous oxide and/or magnesium hydroxide, so far as concerns activity and low chlorine content in the polymer produced, have decided advantages over the catalysts in which the carrier is anhydrous oxide and/or magnesium hydroxide. The most important advantages can be summarized as follows:

1. a definitely higher content of titanium or vanadium bound to the carrier and present in a catalytically active state, which makes it possible to obtain a polymer having a smaller content of foreign substances and, thus, with better characteristics.
2. a higher reactivity of the carrier toward the titanium or vanadium compound, which also results in the producton of a much purer polymer.

The following examples are given to illustrate the invention, and are not intended as limiting. Unless otherwise specified, the percentages given in the examples are percentages by weight.

EXAMPLE 1

60 g of magnesium oxide, having a mean granulometric size of from 15 to 20 microns and a specific surface of 60 m$^2$/g, and further characterized by a loss of weight by calcination at 1,000°C for 24 hours of less than 1 percent, were heated at 100°C for 4 hours. After drying, the mass was suspended in 340 cc of TiCl$_4$ heated at 136°C. The suspension was kept under stirring at said temperature for 1 hour. The solid was then separated by filtering under heat, was first washed twice with boiling TiCl$_4$ and was then washed with n-heptane until the unreacted TiCl$_4$ was completely removed, and finally dried.

From the TiCl$_4$ were separated 7.2 g of solid by-products substantially consisting of TiOCl$_2$. The solid catalytic component thus obtained contained 0.3 percent by weight of Ti and 10.1 percent by weight of Cl.

0.533 g of this solid product, suspended in 1.0 liter of n-heptane, was introduced under a nitrogen atmosphere into a 1.8 liter stainless steel autoclave fitted with a stirrer and heated at 85°C. To this suspension was then added a solution of 2.0 g of aluminum triisobutyl dissolved in n-heptane. Immediately thereafter 10 atm. of ethylene and 4 atm. of hydrogen were introduced into the autoclave and the total pressure was maintained constant by continuously introducing ethylene during the run.

After 2 hours the polymerization was stopped and the polymer was filtered and dried.

In this way 326 g of a powdery white polyethylene were obtained.

EXAMPLE 2

77 g of commercial Mg(OH)$_2$ (hydrated heavy calcinated C. Erba magnesia) were heated for 17 hours at 100°C in a tubular oven in a current of nitrogen. The loss in weight, after heating at 1,000°C for 24 hours, of the hydroxide dried at 100°C amounted to 30.8 percent.

After the drying treatment, the hydroxide was suspended in 330 cc of boiling TiCl$_4$ and was kept therein under stirring for 1 hour. The solid product obtained from the reaction was separated by filtering under heat, was then washed twice with boiling TiCl$_4$, then with n-heptane and was finally dried. From the TiCl$_4$ were separated 9.5 g of by-products. The carrier obtained contained 0.08 percent of Ti and 2 percent of Cl. 0.83 of this carrier were used in the polymerization of ethylene, conducted according to the conditions indicated in Example 1.

After 4 hours, 148 g of a powdery white polyethylene were obtained.

EXAMPLE 3

A portion of the magnesium oxide of Example 1 was humidified by passing nitrogen saturated with water vapour on it for one hour at 25°C. The loss in weight of the product thus obtained, after heating for 24 hours at 1,000°C, was 4.2 percent by weight. Immediately after the humidifying treatment, 60 g of the hydrated oxide were suspended in 340 cc of TiCl$_4$ heated at 136°C. The reaction conditions and the procedures for the separation of the solid product were the same as those described in Example 1. The solid separated from the reaction mixture contained 0.64 percent of Ti and 15.6 percent of Cl.

In the excess of TiCl$_4$, used in the reaction, there were present 4.9 g of solid by-products.

0.29 g of the solid catalytic component thus prepared was used in the polymerization of ethylene, following the procedures of Example 1. After 2 hours of polymerization 286 g of a white, powdery polyethylene were obtained.

EXAMPLE 4

A second portion of the magnesium oxide of Example 1 was submerged in boiling water and kept there for one hour, after which the suspension was filtered. The humid solid product thus separated was then dried by heating it for one hour at 80°C under a vacuum of 400 mm Hg.

The loss in weight, by calcination at 1,000°C for 24 hours, of a fraction of the dried solid amounted to 30.45 percent.

30 g of the hydrated oxide thus obtained were immediately reacted with TiCl$_4$ as described in Example 1. The solid thus obtained contained 0.23 percent of Ti and 6.6 percent by weight of Cl.

The quantity of by-products that had formed during the course of the reaction was evaluated on the strength of the ebullioscopic increase of the TiCl$_4$, which turned out to be 1°C, while in the test of Example 1 it amounted to 3°C.

0.3066 of the catalytic component were then used in the polymerization of ethylene under the same conditions as those specified in Example 1. After 2 hours, 180 g of polyethylene were obtained.

EXAMPLE 5

A third portion of the oxide of Example 1 was immersed in water at 50°C and kept therein for one hour. Thereafter, the excess of water was removed under vacuum (400 mm Hg) at 90°C for one-half hour. The loss in weight of a fraction of this oxide, after calcination at 1,000°C for 24 hours, amounted to 31.25 percent.

70 g of the hydrated oxide thus obtained were reacted with $TiCl_4$ as described in preceding examples. The ebullioscopic increase of $TiCl_4$ between start and end of the test was 1°C. No appreciable quantities of by-products were found after filtering and evaporation of $TiCl_4$.

The catalytic component separated from the reaction mixture contained 0.225 percent by weight of Ti and 5.6 percent by weight of Cl. 0.401 g of this product, used in a polymerization test conducted according to the procedures followed in Example 1, gave 194 g of polyethylene, after 2 hours.

EXAMPLE 6

300 g of magnesium oxide having a specific surface of 125 $m^2/g$ and a mean particle size of from 20 - 25 microns, were immersed in water for 1 hour.

After removal of the water according to the usual technique, the loss of weight of a fraction of the product was determined after calcination at 1,000°C for 24 hours; the loss amounted to 31.4 percent.

60 g of the hydrated oxide were reacted with $TiCl_4$ following the procedures described in the preceding examples. The ebullioscopic increase between start and end of the reaction was 1°C.

The solid obtained contained 0.33 percent of Ti and 10.5 percent of Cl. 0.340 g of this product were then used in the polymerization of ethylene according to the procedures described in Example 1. From the autoclave, 198 g of polyethylene were discharged.

EXAMPLE 7

42 g of magnesium oxide like that of the preceding example, and not yet treated with water, were reacted with $TiCl_4$ under the same conditions as those described in Example 6.

The reaction was very violent and there was a considerable formation of gaseous products. The solid product, separated from the reaction mixture and washed following the same procedure as that of the preceding examples, showed the presence of 5.3 percent of Ti and 35.5 percent of Cl.

0.13 g of that product, used in an ethylene polymerization run conducted according to the procedures of Example 1, did not result in the formation of any appreciable amount of polymer.

EXAMPLE 8

300 g of magnesium oxide having a particle size smaller than 0.1 micron and a specific surface comprised between 10 and 11 $m^2/g$, were immersed in water for 1 hour.

After separation of the excess water by the usual technique the loss of weight of a fraction of the product, after a calcination at 1,000°C for 24 hours, was found to be 32.1 percent.

65 g of the hydrated product were then reacted with $TiCl_4$ according to the usual procedure. The ebullioscopic increase noticed between the start and the end of the reaction amounted to 0.5°C.

The solid obtained showed a content of Ti and Cl of, respectively, 0.7 percent and 12.75 percent by weight.

0.18 g of this solid were used in the polymerization of ethylene under the usual conditions. After 2 hours, 218.8 g of polyethylene were obtained.

EXAMPLE 9

60 g of magnesium oxide of the preceding Example 8, not yet treated with water, were reacted with $TiCl_4$ by using the same procedures followed in Example 8. Between the start and the end of the reaction there was ascertained an ebullioscopic increase of 2°C.

The solid obtained contained 0.1 percent of Ti and 12.1 percent by weight of Cl.

0.75 g of said product was used in the polymerization of ethylene under the same conditions as those described in the preceding examples, and after 2 hours 119 g of polyethylene were obtained.

EXAMPLE 10

200 g of magnesium oxide, having a mean particle size of from 20 to 25 microns and a specific surface of 80 $m^2/g$, were immersed in water and left there for one hour. After removal of the excess water, according to the usual technique, the weight loss determined on a fraction of the product, after calcination at 1,000°C for 24 hours, was found to be 31.6 percent by weight.

80 g of the hydrated oxide were suspended in a mixture consisting of 50 percent by weight of technical heptane and 50 percent of $TiCl_4$. The reaction temperature was 116°C through out the treatment, which lasted 1 hour.

The reaction mixture was then filtered and the solid product thus obtained was first washed with a mixture heptane/$TiCl_4$ of the same composition as that of the starting mixture, and then with heptane until the $TiCl_4$ was completely removed. In the washed solid were found 0.38 percent of Ti and 5 percent of Cl.

0.6 g of this catalytic component were used in the polymerization of ethylene, under the same conditions as those indicated in the preceding examples. After 2 hours 190 g of polyethylene were obtained.

EXAMPLE 11

100 g of magnesium oxide, having a particle size comprised between 15 and 20 microns, a specific surface of 60 $m^2/g$ and a loss of weight, after calcination for 24 hours at 1,000°C, amounting to 3.1 percent, were treated with a nitrogen current saturated with water vapour, at 50°C, for a time sufficient for introducing into it a quantity of water equal to 4 percent by weight.

The total loss of weight of the oxide, after the hydration treatment, was 7.1 percent (after heating at 1,000°C for 24 hours).

10 g of the hydrated oxide were reacted with $TiCl_4$ according to the usual technique. The solid product thus obtained showed a content in Ti of 0.63 percent and in Cl of 17.1 percent by weight.

0.43 g of this solid was then used in the polymerization of ethylene under the usual conditions. After 2 hours of reaction, 180 g of polyethylene were obtained, having an intrinsic viscosity measured in tetralin at 135°C of 2.6 dl/g.

EXAMPLE 12

60 g of magnesium hydroxide, having a particle size comprised between 5 and 20 microns, a specific surface of about 5 m²/g and a loss of weight of 31.5 percent after a heating for 24 hours at 1,000°C, were treated in a fluid bed in an air current saturated with water vapour at 40°C for 0.5 hour. After this treatment, the loss in weight determined on a fraction of the hydrated product, after heating for 24 hours at 1,000°C; amounted to 36.5 percent.

50 g of the hydrated product thus obtained were suspended in 330 cc of $TiCl_4$ heated to 136°C. The reaction and separation conditions of the solid product at the end of the reaction were the same as those used in preceding examples. The ebullioscopic increase between the start and the end of the reaction amounted to 3°C. The solid product obtained contained 0.25 percent of Ti and 7.6 percent by weight of Cl.

0.540 g of this product was used in a test of the polymerization of ethylene, conducted under the same conditions as those described in the preceding examples, and after 2 hours there were obtained 302 g of polymer.

EXAMPLE 13

0.43 g of the catalytic component of Example 11 was used in a polymerization test on ethylene carried out under the same conditions as those indicated in Example 11, with the difference, however, that hydrogen was not introduced into the autoclave.

After 2 hours of polymerization, there were obtained 236 g of polymer showing an intrinsic viscosity, measured in tetralin at 135°C, of 8.6 dl/g. The intrinsic viscosity of the polymer obtained operating according to Example 11 was, on the contrary, 2.6 dl/g.

Changes and modifications can be made in details in practicing the invention, without departing from its spirit. Therefore, we intend to include in the scope of the appended claims all such variations as may be obvious to those skilled in the art from the description and working examples given herein.

What is claimed is:

1. Catalysts for the polymerization of olefins comprising a reaction product of
   a. a catalyst-forming component which is the solid product obtained by reacting a liquid, halogenated compound of titanium or vanadium with a solid carrier containing chemically uncombined water in amount detectable from inspection of the absorption isotherms of the MgO–$H_2O$ system and by examination of the X-ray spectra, and the composition of which corresponds to the formula
   $MgO \cdot [Mg(OH)_2]_x \cdot (H_2O)_y$
   in which
   x is a number greater than 0 and is 100 or less;
   y is a number greater than 0 and comprised between 0 and 1;
   $[Mg(OH)_2]_x$ expresses the number of hydroxyl groups present in the carrier, however combined; and $(H_2O)_y$ represents the number of chemically uncombined molecules of water present in the carrier, said carrier containing chemically uncombined water being obtained from oxygenated magnesium compounds selected from the group consisting of magnesium oxide and magnesium hydroxide by hydration treatment with water or with water vapor; with
   b. another catalyst-forming component which is an organometallic compound or hydride of a metal belonging to Groups I to III inclusive of the Mendelyeev Periodic Table.

2. A catalyst according to claim 1, characterized in that, in the formula representing the composition of the carrier, x is less than 2, and y is less than 0.6.

3. A catalyst according to claim 1, characterized in that the carrier is prepared by hydration of magnesium oxide obtained by calcination of magnesium hydroxide, has a specific surface area comprised between 10 and 100 m²/g, a mean particle size comprised between 10 and 30 microns, and contains less than 0.2 hydroxyl groups per mole.

4. A catalyst according to claim 3, further characterized in that the magnesium oxide is hydrated by passing a current of humidified air, or of humidified inert gas, over the oxide, at a temperature below 60°C.

5. A catalyst according to claim 1, characterized in that the liquid halogenated compound is selected from the group consisting of halides, oxyhalides, and haloalcoholates of titanium and vanadium and is reacted with the carrier in the absence of a solvent.

6. A catalyst according to claim 1, characterized in that the solid reaction product (a) of the liquid halogenated transition metal compound with the solid carrier is mixed with a compound (b) which is an alkyl aluminum compound selected from the group consisting of trialkyl aluminum and dialkyl aluminum monohalides.

7. A process for the polymerization of ethylene and mixtures thereof with at least one other monomer selected from the group consisting of higher alpha-olefins and diolefins copolymerizable therewith, characterized in that the monomeric material is polymerized in contact with a catalyst as defined in claim 1.

8. The process according to claim 7, further characterized in that the monomeric material is polymerized at a temperature comprised between −80°C and 200°C, in the presence of an inert liquid diluent, to a polymer useful as such, without requiring purification treatments to remove catalyst residues therefrom.

9. The process according to claim 7, further characterized in that the monomeric material is polymerized at a temperature comprised between −80°C and 200°C, in the absence of an inert liquid diluent, to a polymer useful as such, without requiring purification treatments to remove catalyst residues therefrom.

10. A catalyst according to claim 1, characterized in that, in the formula representing the composition of the carrier, x is less than 0.5, and y is less than 0.6.

11. A catalyst according to claim 2, characterized in that the carrier is prepared by hydration of magnesium oxide obtained by calcination of magnesium hydroxide, has a specific surface area comprised between 10 and 100 m²/g, a mean particle size comprised between 10 and 30 microns, and contains less than 0.2 hydroxyl groups per mole.

12. A catalyst according to claim 2, characterized in that the liquid halogenated compound is selected from the group consisting of halides, oxyhalides, and halo-alcoholates of titanium and vanadium and is reacted with the carrier in the absence of a solvent.

13. A catalyst according to claim 2, characterized in that the solid reaction product (a) of the liquid halogenated transition metal compound with solid carrier is mixed with a component (b) which is an alkyl aluminum compound selected from the group consisting of trialkyl aluminum and dialkyl aluminum monohalides.

* * * * *